Oct. 22, 1929.    J. ROBINSON    1,732,539

AUTOMATIC TRAIN PIPE COUPLING

Original Filed Nov. 23, 1921

INVENTOR
Joseph Robinson
BY
Watson, Coit, Morse & Grindle
ATTORNEY

Patented Oct. 22, 1929

1,732,539

UNITED STATES PATENT OFFICE

JOSEPH ROBINSON, OF NEW YORK, N. Y.

AUTOMATIC TRAIN-PIPE COUPLING

Application filed November 23, 1921, Serial No. 517,332. Renewed May 14, 1928.

My invention relates to improvements in automatic train pipe couplings, and has among its objects to provide an improved means for renewing defective gaskets from between mated coupling heads without disconnecting the cars. To this end the invention resides in the combinations, arrangements, and constructions hereinafter described, pointed out in the appended claims, and illustrated in the accompanying drawings in which Figure 1 is a side elevation of my improvement. In this view a part of a suitable support for carrying the head is shown, and a portion of the conduit 9 is broken away.

Figure 1:
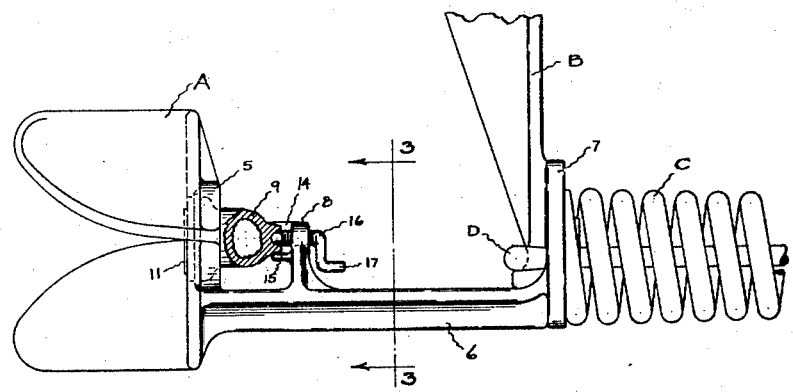

Referring now to the drawings: Any suitable form of coupling head A may be provided with my improvement, and the head may be supported from the car coupler in any desired manner. I show at B a satisfactory form of bracket for attaching the connector to the car coupler, and at C I illustrate a conventional form of buffer spring pivotally tied to the lower end of the bracket B as by a tie rod D. A universal support of this type is illustrated and described in my co-pending application Serial No. 342,138 filed December 3, 1919.

I provide the coupling head A with a centrally located opening 4, and with a rearwardly extending sleeve or nipple 5 surrounding the opening. Extending rearwardly from the lower side of this sleeve I provide a shank or member 6 attached to the coupling head A in any suitable manner and provided at its rear end with a vertically extending perforated flange or projection 7 formed integral with or otherwise secured to the shank 6. Against the rear face of this flange 7 the buffer spring C bears, as shown.

At the rear of the nipple 5 and in line with the opening 4 in the head A I provide the strap 6 with a vertically extending abutment or projection 8 provided with a threaded perforation located preferably on a line concentric with the center of said opening. A curved fitting or conduit 9 having an enlarged forward end 10 provided with a suitable gasket seat in which is mounted a gasket 11, and having also an annular flange 12, extends into the opening 4 with the flange 12 bearing against the rear side of the head A, as shown particularly in Figure 2. Upon the rear side of the conduit 9 I provide a boss 13 adapted to rest on a bench or support comprising a vertically extending wall 14 against which the boss 13 abuts when the fitting 9 is inserted in the head A and brought to the proper position for service, and a lower or horizontal wall 15 which serves to position the fitting 9 horizontally. A suitable screw or other locking device 16 is threaded through the opening in the projection or abutment 8 and into a socket in the boss 13, as shown particularly in Figure 2. In this manner the conduit 9 is locked in the service position with the flange 12 thereof abutting the rear side of the coupling head A. A suitable thumb piece or crank 17 is provided for rotating the screw into and out of engagement with the conduit 9, and any desired means may be provided for preventing complete extraction of the screw 16 from the bracket or abutment 8.

Under some conditions it is desirable that the conduit 9 may rotate about the screw 16 and in the opening 4 of the head, in this manner preventing undue localization of stresses in the train pipe hose. Where such rotation is desirable, it will of course be understood that the screw 16 should not in that event be screwed forward into the fitting 9 sufficiently to force it rigidly against the rear side of the head, but should be screwed forward a sufficient distance to prevent lateral displacement of the fitting 9 but not sufficient to force it tightly against the coupling head and thus prevent the rotation desired.

Figure 2:
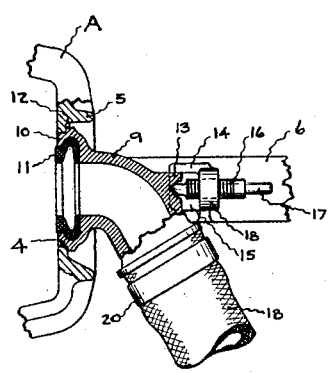
Figure 2 is a sectional plan view taken approximately on the line 2—2 of Figure 3.
Figure 3:
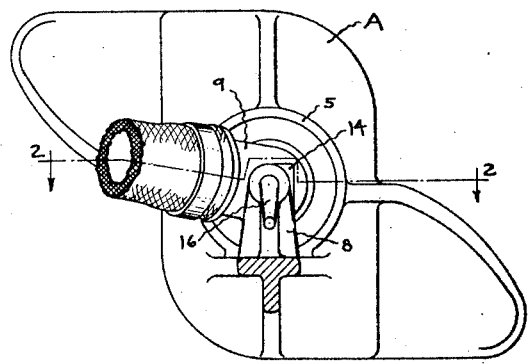
Figure 3 is a rear elevation of my improvement taken on approximately the line 3—3 of Figure 1.

As appears particularly in Figure 2 the conduit 9 diverges laterally of the head A and terminates in the usual form of shank for receiving the ordinary train pipe hose 18. Any suitable clamp 20 may be employed for attaching the hose directly to the rear end of the conduit 9.

Figure 4:
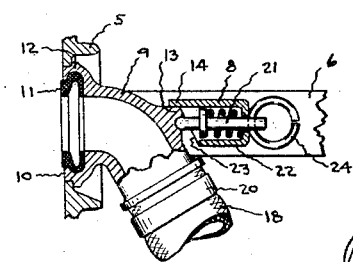
Figure 4 is a section similar to Figure 3, showing a modification of my improvement.

In Figure 4 I have illustrated a modification of my improvement which consists in substituting a spring actuated plunger 21 for the screw 16, the plunger being held in the forward position by a suitable compression spring 22. In this embodiment of my invention the conduit 9 is moved forward to the service position shown, by contact of the boss 13 with the angled face 23 of the projection 8, as shown. With this arrangement the spring actuated plunger 20 serves merely to prevent accidental dislodgment of the conduit 9 from the service position, the boss 13 contacting with the abutment 8 serving to hold the conduit in place against rearward movement.

It will be understood that the forward end of the conduit 9 is positioned in the coupling head A with its face 10 disposed in substantially the plane of the coupling face of such head, as shown. When it is desired to remove a defective gasket 11 from between mated coupling heads the screw 16 is rotated to the rear sufficiently to permit the conduit to be lifted off the bench formed by the walls 14 and 15, and out of the opening 4 of the head A, whereupon the defective gasket may be readily renewed. The reverse of this operation will reassemble these parts. In the case of the modified form of my invention the plunger 20 is moved rearwardly against the tension of the spring 21 by pulling on the eye or ring 24, until the plunger leaves the boss 13 whereupon the fitting may be readily extracted from the coupling head.

What I claim is:—

1. An automatic train pipe coupling comprising in combination, a coupling head, a support therefor, a conduit extending into the head from the rear side of the latter, said conduit being provided with a gasket, and means located on substantially the longitudinal axis of said head and adjustable forward and backward relative to the head to lock said conduit in the head and to permit removal therefrom while said head remains connected with a counter-part head.

2. An automatic train pipe coupling comprising in combination, a coupling head having an opening at substantially its center, a support for said head, said support including a suitable shank having a projection thereon, a conduit positioned between said projection and the rear side of said head, said conduit having an enlarged forward end projecting in said opening and carrying a gasket, and means mounted on said projection and adjustable horizontally for maintaining said conduit between said projection and said head with said gasket disposed in approximately the plane of the coupling face of said head, said means permitting removal of said conduit and gasket while said coupling head remains coupled to a counter-part head.

3. An automatic train pipe coupling comprising in combination, a coupling head having a perforation, a shank extending rearwardly from the rear side of said head and from a point to one side of said opening, a projection on said shank and extending at an angle thereto, the projection being provided with an opening, a conduit between said projection and said coupling head and extending into the opening in the head, and a locking device located in said projection and movable into and out of engagement with said conduit to removably lock the same in said head.

4. An automatic train pipe coupling comprising in combination, a coupling head having therein an opening, a shank extending rearwardly of said head, an abutment carried by said shank, a conduit having its forward end projecting into said opening and carrying a gasket, means on the conduit and the abutment for positioning the conduit with respect to said head, and adjustable means mounted on said abutment for locking said conduit in position.

5. An automatic train pipe coupling comprising in combination, a coupling head having an opening, a conduit having one end mounted in said opening and the other end extending to one side of said coupling head and connected with a train pipe hose, a shank connected with said head and carrying an abutment, means on the abutment and conduit for positioning the latter in said head, the conduit being adapted to rotate slightly in the head, and means mounted in said abutment and extending therethrough into engagement with said conduit for removably locking the latter in the service position.

6. In an automatic train pipe coupling, the combination of a coupling head having an opening therein, a shank connected to said head and having an abutment, a tubular conduit extending into the opening in said head and means to support said conduit in said opening and to permit removal thereof from the opening while mated coupling heads remain coupled, said means comprising a member carried by said abutment and bodily movable toward and from the opening in said coupling head substantially on an axis coincident to the axis of the opening.

7. In an automatic train pipe coupling, the combination of a coupling head having an opening therein, a head supporting member connected to said head and having a threaded portion, a tubular conduit extending into the opening in said head and means to support said conduit in said opening and to permit removal thereof from the opening while mated coupling heads remain coupled, said means comprising a device threaded into said threaded portion of said head supporting member and adapted to be rotated into and out of engagement with the rear side of said conduit.

8. In an automatic train pipe coupling, the combination of a coupling head provided with a coupling face and having an opening therein adapted to removably receive a tubular conduit, means for locking the tubular conduit in said opening, said means comprising a member movable toward and from said face and into and out of engagement with the tubular conduit mounted in said opening.

9. In an automatic train pipe coupling, the combination of a coupling head having an opening therein, a tubular conduit arranged in said opening and extending rearwardly of said head, means to support said conduit in said opening and to permit removal thereof from the opening while mated coupling heads remain coupled, said means comprising a device adjustable toward and from said opening and positioned to contact with and lock said tubular member in the head when adjusted toward said opening.

10. In an automatic train pipe coupling, the combination with a coupling head, of a bracket, a head supporting member connected to said head and extending rearwardly past said bracket, a fitting removably mounted in said head, a rod having the front end thereof arranged to engage said fitting to hold the same in said head, said rod having threaded engagement with said head supporting member.

11. In an automatic train pipe coupling, the combination with a coupling head, of a bracket, a head supporting member connected to said head and extending rearwardly past said bracket, an abutment mounted on said head supporting member in front of said bracket, a fitting removably mounted in said head, a rod having the front end thereof arranged to engage said fitting to hold the same in said head, said rod having threaded engagement with said abutment.

12. In an automatic train pipe coupling, the combination with a coupling head, of a bracket, a head supporting member connected to said head and extending rearwardly past said bracket, said member being provided with a threaded portion arranged in front of said bracket, a fitting removably mounted in said head, a rod threaded into the threaded portion of said member and arranged to move forwardly and rearwardly to hold said fitting in place in the head or permit removal thereof.

In testimony whereof I hereunto affix my signature.

JOSEPH ROBINSON.